United States Patent
Dany et al.

[15] 3,663,174
[45] May 16, 1972

[54] PROCESS FOR THE MANUFACTURE OF PASSIVATED RED PHOSPHORUS

[72] Inventors: Franz-Josef Dany, Erftstadt Lechenich; Klaus Komorniczyk, Turnich; Hilmar Roszinski, Kendenich; Gerhard Kalteyer, Erftstadt Erp, all of Germany

[73] Assignee: Knapsack Aktiengesellschaft, Knapsack near Cologne, Germany

[22] Filed: Dec. 22, 1970

[21] Appl. No.: 100,846

[30] Foreign Application Priority Data

Jan. 2, 1970 Germany ...................P 20 00 033.3

[52] U.S. Cl. ............................................23/223, 117/100 B
[51] Int. Cl. ..............................................C01b 25/04
[58] Field of Search..................................23/223; 117/100 B

[56] References Cited

UNITED STATES PATENTS

| | | | |
|---|---|---|---|
| 3,488,711 | 1/1970 | Dany et al. | 23/223 X |
| 2,559,684 | 7/1951 | Skolnick et al. | 23/223 |
| 2,399,120 | 4/1946 | Hurd | 23/223 |

FOREIGN PATENTS OR APPLICATIONS

| | | | |
|---|---|---|---|
| 826,920 | 1/1960 | England | 117/100 B |

Primary Examiner—Oscar R. Vertiz
Assistant Examiner—Charles B. Rodman
Attorney—Connolly and Hutz

[57] ABSTRACT

Production of passivated red phosphorus. Between about 10 and 85 weight percent powdered red phosphorus having a particle size of up to 100 microns is treated with between about 90 and 15 weight percent of molten $\epsilon$-caprolactam, under inert gas; the resulting homogeneous and phosphorus-containing blend is cooled in a suitable cooler until solid; and solidified material in the form of lumps or scale is removed from the cooler.

10 Claims, No Drawings

PROCESS FOR THE MANUFACTURE OF PASSIVATED RED PHOSPHORUS

The present invention relates to the production of passivated red phosphorus with the use of ε-caprolactam as a passivating agent.

Red phosphorus is commonly used for fire-proofing plastics, for example polyvinyl chloride or polyurethanes. To this end, red phosphorus in powder form may, for example, be incorporated with the plastics material. Red phosphorus, more particularly finely divided red phosphorus, is a material which is readily inflammable in contact wit oxygen or air, and therefore is not easy to handle. To avoid premature and undesirable ignition of red phosphorus, it has been necessary heretofore to handle powdered red phosphorus either under inert gas, for example for the purpose of incorporating it with plastics material, or passivate it by making it into a paste with a suitable liquid, prior to further use thereof. The treatment of phosphorus under inert gas is, however, a very costly procedure which is sometimes impossible to carry out technically, especially in those cases in which large quantities of plastics are concerned. Red phosphorus pastes on the other hand find limited use only. It is therefore highly desirable to have a process for the production of scarcely inflammable powdered or granulated phosphorus.

The passivation of impregnation of red phosphorus has already been described in German Pat. No. 1,185,591, wherein powdered red phosphorus having a particle size of less than 1 mm is intimately blended at room temperature with solid, finely divided paraffin and/or wax in a ratio by weight of phosphorus/paraffin and/or wax of between 9:1 and 19:1. The resulting blend is heated to a temperature slightly above the melting point of the paraffin and/or wax, and then cooled. The blend may be agitated, if desired, during the heating and/or cooling steps. Phosphorus passivated by means of paraffin is, however, unsuitable for use as a flame-retarding agent in plastics. It should be added that red phosphorus is difficult to wet with paraffin with the result that the individual phosphorus particles are, at best, superficially enveloped by a paraffin film. Needless to say, it is impossible to transform a blend so made into a homogeneous mass.

We have now discovered that ε-caprolactam is a particularly useful agent for passivating red phosphorus. ε-caprolactam has more particularly been found to have a surprisingly good wetting effect upon phosphorus particles with the resultant formation of a homogeneous blend having considerable phosphorus therein. The blend, which preferably is in powder form or in the form of granules, may contain between 10 and 85 weight percent of red phosphorus and between 90 and 10 weight percent of ε-caprolactam.

The process of the present invention for making passivated red phosphorus comprises subjecting between about 10 and 85 weight percent of powdered red phosphorus having a particle size of up to about 100 microns to treatment with between about 90 and 15 weight percent of molten ε-caprolactam, under inert gas; cooling the resulting homogeneous and phosphorus-containing melt in a cooler until solid; removing solidified, lumpy or scaly material from the cooler and transforming the lumpy or scaly material into powder or granules, if necessary or convenient.

An exemplary embodiment of the process of the present invention comprises introducing the red phosphorus into molten ε-caprolactam, and a further exemplary embodiment comprises blending the red phosphorus first with solid, particulate ε-caprolactam and then melting the ε-caprolactam by heating the blend to a temperature of between about 80° and 90° C.

The powdered red phosphorus to undergo passivation should preferably have a particle size of between 5 and 60 microns. As a result, an extensively homogeneous blend having finely divided phosphorus therein is obtained. The passivation can be carried out under commercially attractive conditions by the introduction of as large a proportion of phosphorus as possible, which, however, must not affect the flowability of the resulting molten blend, into a given quantity of ε-caprolactam. A melt of good flowability is obtained by subjecting between 60 and 75 weight percent of red phosphorus to treatment with between 40 and 25 weight percent of ε-caprolactam.

While it is necessary to operate under inert gas, for example nitrogen or carbon dioxide, to avoid ignition of the red phosphorus during preparation of the molten blend, it is unexpectedly unnecessary to take this precaution upon supplying the melt to the cooling means and during the cooling step. The cooling means preferably is a cooling roller or belt cooler from which solidified, lumpy or scaly material is easy to remove by means of a scraper.

The following statements are intended to further illustrate the process of the present invention.

The first alternative process step described hereinabove, comprising introducing red phosphorus into molten ε-caprolactam should generally be favored over the second alternative process step comprising making a blend from the solid components and later melting the blend having the ε-caprolactam therein. The reason for this resides in the fact that less energy is required to be used in the first alternative process step than in the second for outweighing the shearing forces, which occur on effecting the blending step. In other words, the first alternative process step may be carried out in simple, heatable agitator vessels. However, regardless of the different alternative steps used in carrying out the process of the present invention, it may be effected continuously or intermittently.

In carrying out the process of the present invention, it is an important requirement for the melt suspension of red phosphorus and ε-caprolactam to have a good flowability, as already mentioned above, so that it can readily be taken from the mixing vessel. The fact that melts with a high concentration of red phosphorus therein possess good flow properties must be regarded as an unexpected result. Corresponding blends of red phosphorus and paraffin, for example, are not flowable. The flow properties of blends prepared in accordance with the present invention are compared with the flow properties of blends consisting of red phosphorus and paraffin, in the following table. The flow properties were determined on blends having the composition indicated below, which were melted at a constant temperature of 85° C. in a heatable funnel. The funnel outlet opening was a capillary tube 5 mm long with an internal diameter of 2.5 mm. The quantity of molten material issuing from the capillary tube per unit of time is the flowability index of the melt.

TABLE

| Composition of blend | | | Time of flow (seconds) | Rate of flow (grams) |
|---|---|---|---|---|
| wt. per. phosphorus | wt. per. caprolactam | wt. per. paraffin | | |
| 10 | 90 | — | 23 | 50 |
| 20 | 80 | — | 24 | 50 |
| 40 | 60 | — | 37 | 50 |
| 60 | 40 | — | 122 | 50 |
| 65 | 35 | — | 265 | 50 |
| 68 | 32 | — | 300 | 24.5 |
| 70 | 30 | — | 300 | 20 |
| 75 | 25 | — | 300 | 8.0 |
| 76 | 24 | — | 300 | 3.9 |
| 77 | 23 | — | 300 | 2.0 |
| 10 | — | 90 | 22 | 50 |
| 20 | — | 80 | 22 | 50 |
| 40 | — | 60 | 27.5 | 50 |
| 60 | — | 40 | 255 | 50 |
| 62 | — | 38 | 282 | 50 |
| 65 | — | 35 | 300 | 4.7 |
| 70 | — | 30 | 300 | 1.3 |
| 75 | — | 25 | 300 | — |

The above table shows that a blend prepared in accordance with the present invention and having 77 weight percent of phosphorus therein is still flowable. This in contrast with the comparative blend having approximately 70 weight percent of phosphorus therein, which is not flowable.

The present process is a very desirable step forward in the art as it enables phosphorus to be reliably and safely concentrated in ε-caprolactam. The concentrate in turn is very well adapted for the many uses of red phosphorus, for example in fire-proofing plastics materials.

EXAMPLE 1

A heatable 240-liter vessel fitted with an anchor stirrer was fed first with nitrogen to expel the air therein and then with 33.3 kg of ε-caprolactam, which was melted therein at a temperature of between 80° and 90° C. A dosing screw maintained under nitrogen was used to introduce 100 kg pulverulent red phosphorus having a particle size of less than 100 microns into the melt. The phosphorus was more particularly introduced in a manner such that the temperature remained within the range specified above. Following complete homogenization of the blend, the nitrogen pressure prevailing in the agitator vessel was increased to 2 atmospheres gauge, a valve disposed in the bottom portion of the agitator vessel was opened and the melt was removed. The melt was delivered to a rotating cooling roller and found to solidify thereon with 5 seconds, at 20° C. Solidified, scaly product was removed from the roller surface by means of a scraper. 90 percent of the scaly particles had a size of less than 10 mm and a thickness of substantially 1 mm.

EXAMPLE 2

The procedure was the same as that described in example 1, save that the melt issuing from the agitator vessel through slit-shaped nozzles was delivered to a belt cooler maintained at a temperature of 20° C. The melt was found to solidify within 10 seconds. The solidified material was in the form of flat rods with the dimensions of 5 × 20 × 1.5 mm, which were removed by means of a scraper.

EXAMPLE 3

A heatable 200-liter double screw mixer was fed with 70 kg of pulverulent red phosphorus having a particle size of less than 100 microns and with 30 kg of finely divided ε-caprolactam, and the two components were intimately mixed together. During the mixing step, the double screw mixer was heated to 85° C, under nitrogen. Following intimate mixing, a homogeneous melt suspension of red phosphorus in ε-caprolactam was obtained, at the end of 40 minutes. The melt suspension was delivered, in the manner described in example 1, to a cooling roller, allowed to solidify thereon, and scaly material was removed therefrom by means of a scraper.

We claim:

1. Passivated red phosphorus consisting of a homogeneous blend of between 10 and 85 weight percent of red phosphorus and between 90 and 15 weight percent of ε-caprolactam, in powder or in the form of granules.

2. A process for the manufacture of passivated red phosphorus which comprises subjecting between about 10 and 85 weight percent of powdered red phosphorus having a particle size of up to 100 microns to treatment with between about 90 and 15 weight percent of molten ε-caprolactam, under inert gas; cooling the resulting homogeneous and phosphorus-containing melt in a cooler until solid; and removing solidified lumpy or scaly material from the cooler.

3. The process as claimed in claim 2, wherein the solidified material is transformed into powder or granules.

4. The process as claimed in claim 2, wherein the red phosphorus is introduced into molten ε-caprolactam.

5. The process as claimed in claim 2, wherein the red phosphorus is intimately blended first with solid finely divided ε-caprolactam and the resulting blend is heated to melt the ε-caprolactam therein.

6. The process as claimed in claim 5, wherein the blend is heated to a temperature of between about 80° and 90° C.

7. The process as claimed in claim 2, wherein the red phosphorus has a particle size of between about 5 and 60 microns.

8. The process as claimed in claim 2, wherein between about 60 and 75 weight percent of red phosphorus are treated with between about 40 and 25 weight percent of ε-caprolactam.

9. The process as claimed in claim 2, wherein the inert gas is nitrogen or carbon dioxide.

10. The process as claimed in claim 2, wherein the phosphorus-containing melt is cooled on a cooling roller or belt cooler.

* * * * *